No. 623,399. Patented Apr. 18, 1899.
E. GERMAINE.
VELOCIPEDE PEDAL.
(Application filed Jan. 7, 1898.)

(No Model.)

WITNESSES.

INVENTOR:
E. Germaine

BY

ATTORNEYS.

THE NORRIS PETERS CO., PHOTO-LITHO., WASHINGTON, D. C.

UNITED STATES PATENT OFFICE.

EUGÉNE GERMAINE, OF PARIS, FRANCE, ASSIGNOR TO HIMSELF AND JACQUES STERNBERG, OF SAME PLACE.

VELOCIPEDE-PEDAL.

SPECIFICATION forming part of Letters Patent No. 623,399, dated April 18, 1899.

Application filed January 7, 1898. Serial No. 665,890. (No model.)

*To all whom it may concern:*

Be it known that I, EUGÉNE GERMAINE, of the city of Paris, France, have invented Improvements in Pedals for Velocipedes and the Like, of which the following is a full, clear, and exact description.

This invention relates to a velocipede-pedal of novel construction.

The main object of the invention is to provide improved means for attaching the pedal to the axle, so that the connection and disconnection can be effected quickly and readily.

The invention consists in the novel construction and combination of the several parts, as will be fully described hereinafter and then pointed out in the claims.

The invention will be best understood by reference to the accompanying drawings, showing, by way of example, a pedal arranged in accordance with my invention.

Figure 1:
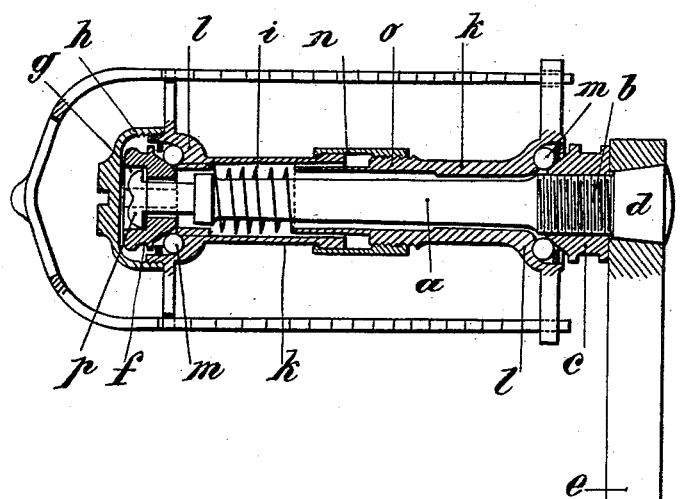
Figure 2:
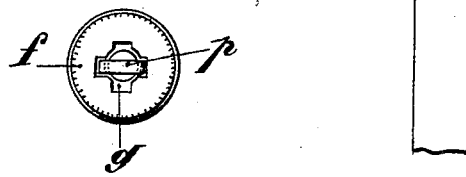

In the said drawings, Figure 1 is a vertical longitudinal section of the complete arrangement, while Fig. 2 is an end view of the cone which serves for mounting the pedal on the crank-axle.

Like letters of reference designate like parts in both the figures.

As will be seen from the drawings, the tapering axle $a$ is screw-threaded at the part $b$, whereon the cone $c$ is screwed, and it terminates in a taper-head $d$, which is inserted into an aperture of corresponding shape provided for the purpose in the crank $e$, while the opposite end of the axle $a$ terminates in a T-shaped part $p$, which serves to retain the cone $f$ by means of its notches $g$. The cone $f$ is covered by a cap $h$. A spring $i$, wound around the axle $a$, acts by its extremities upon the covering or protecting tubes $k$, being also the holders of the cups $l$ of the ball-bearings. The said tubes $k$, which are capable of telescoping or sliding within each other, tend, however, under the action of the spring $i$, to move away from each other in opposite directions, so that the balls $m$ are at all times forced into contact with the cones $c$ and $f$, respectively, for the adjustment of which cones there is provided a ring $n$, screwed onto the threaded portion $o$ of one of the tubes $k$.

When the pedal has been mounted upon the pedal-axle in the manner just described, it may be disconnected again, if required, as follows: The cap $h$ is first unscrewed. Then by pressing upon the end of the pedal the cone $f$ is moved toward the cone $c$, while at the same time the T-shaped part or heel-piece $p$ of the axle $a$ is disengaged from one of the notches $g$ of the cone $f$, which cone need now only be turned to the extent of a quarter of a circle to enable it and the pedal proper to be removed. There only therefore remains the axle $a$ retained upon the crank by the cone $c$. To remove the axle, the cone $c$ is unscrewed.

From the foregoing description it will readily be understood that by reversing operations the pedal may be with equal expedition connected and disconnected.

It will be understood that the means employed for mounting the pedal on the crank may apply not only to the pedal proper illustrated, but to pedals of every description.

The shapes and dimensions adopted, the materials employed, and the details of construction of my improved pedal arrangement may be varied without departing from the principle of the invention.

I claim—

1. The combination of an axle, a cone secured to one end thereof, a cross-piece at the other end of said axle, a removable cone through which the said cross-piece is adapted to pass, the said cone being provided with notches in its outer face adapted to be engaged by the said cross-piece, ball-cups arranged on the axle between the cones, balls interposed between the cups and cones, the ball-cup adjacent to the removable cone being movable toward and from the other cup, and a spring pressing the said cup toward the removable cone and also pressing the removable cone outward, substantially as described.

2. The combination of an axle, a cone secured to one end thereof, a cone removably held on the other end of the axle, a casing turning on the axle and comprising two sections each having a ball-cup at its outer end, one of said sections having a screw-thread formed on its outer surface and a reduced inner end extending beyond the screw-threaded portion, the inner end of the other section loosely engaging the reduced end of the first-mentioned section and formed at its end with a flange, a spring encircling the axle and normally pressing the said sections apart, and a ring formed with an internal thread at one end and adapted to screw on the threaded portion of the first-mentioned section, the other end of said ring being formed with an inwardly-extending flange adapted to engage the flange on the other section, substantially as described.

3. In a pedal for velocipedes and the like, the combination with an axle secured at one end to the crank, a cone secured on said end of the axle, the axle terminating at its other end in a cross-piece, and a pedal proper having a casing mounted to turn on the axle and provided with ball-cups, of a cone through which the cross-piece of the axle is adapted to pass, the said cone being provided with notches adapted to be engaged by the said cross-piece of the axle or disengaged therefrom when the cone is given a partial turn, whereby the pedal proper can be readily and quickly placed upon or removed from the axle, and a spring serving to force the cone outward to hold it with its notches in engagement with the cross-piece of the axle, substantially as described.

The foregoing specification of my improvements in pedals for velocipedes and the like signed by me this 22d day of December, 1897.

EUGÈNE GERMAINE.

Witnesses:
EDWARD P. MCLEAN,
MAURICE HENRI PIGNET.